Jan. 4, 1938.   M. J. DRUYVESTEYN ET AL   2,104,073
GASEOUS ELECTRIC DISCHARGE DEVICE
Filed July 28, 1936
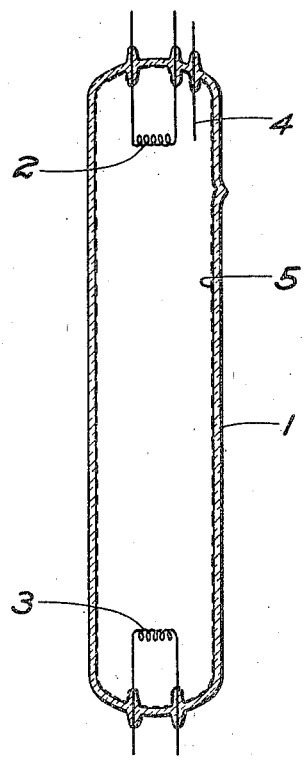
INVENTORS
Mari J. Druyvesteyn
Nicolaas Warmoltz
BY Harry E. Dunham
ATTORNEY Patented Jan. 4, 1938

2,104,073

UNITED STATES PATENT OFFICE 2,104,073

GASEOUS ELECTRIC DISCHARGE DEVICE

Mari J. Druyvesteyn and Nicolaas Warmoltz, Eindhoven, Netherlands, assignors to General Electric Company, a corporation of New York Application July 28, 1936, Serial No. 93,112
In Germany August 6, 1935

4 Claims. (Cl. 176—122)

The present invention relates to gaseous electric discharge devices generally and more particularly the invention relates to such devices the gaseous atmosphere of which consists of or comprises the vapor of a chemically active material, such as the vapor of an alkali, or an alkaline earth metal.

One of the problems in the manufacture of gaseous electric discharge lamps having a gaseous atmosphere consisting of or comprising a chemically active vapor is to obtain container glasses which are inert with respect to the hot, ionized, chemically active vapor since the lead or lime glasses commonly used in the manufacture of incandescent lamps and gaseous electric discharge lamps containing an inert gas, such as neon, are strongly attacked and blackened by such vapors. Recently special boro-silicate glasses have been developed which are substantially immune from attack by such vapors and which retain their transmissibility for the light emitted by the ionized vapor for a period which makes a discharge lamp having a container made of such glass commercially feasible.

The object of the present invention is to provide a simple, inexpensive method of treating the usual container glasses of gaseous electric discharge devices to render said containers immune from attack by chemically active material, such as vapors of the alkali or alkaline earth metals. Another object of the invention is to provide a gaseous electric discharge lamp the gaseous atmosphere of which consists of or comprises a chemically active metal vapor which lamp is inexpensively manufactured and which has a long useful operating life. Still further objects and advantages attaching to the device and to its use and operation will be apparent to those skilled in the art from the following particular description.

We have discovered that the above objects are attained when the surface of the glass is covered with the oxide of an alkali or alkaline earth metal or with aluminum oxide. The oxide coating is very thin, being in the nature of a thin skin and is formed on the glass by bringing into contact with the glass surface the vapor of the metal the oxide of which is to form the skin. At the same time the glass is heated to a temperature such that the metal vapor attacks the glass physically, by which we mean that while no perceptible chemical change is caused in the glass by the metal vapor a diffusion of the metal particles into the glass and an absorption of said particles on the glass surface takes place. An atmosphere containing oxygen is then brought into contact with the treated surface and the metal in and on the glass is oxidized. The physical attack of the vapor causes a slight discoloration of the glass but in many cases it is possible to partially remove this discoloration by heating the glass to drive off the metal atoms which have diffused into the surface thereof.

We have demonstrated that an oxide skin on the surface of the glass appreciably diminishes the chemical attack on the glass by the vapor. Our explanation of this result is that the chemical attack of the glass by the vapor is due to the acid oxides on the surface of the glass. The oxide skin of the present invention covers these acid oxides with basic or amphoteric oxides of the alkali or alkaline earth metals or with aluminum oxide so that the acid oxides are protected from the metal vapor. It is not essential that the skin be a continuous one since appreciable protection is afforded thereby even when only the spots at which the acid oxides of the glass come to the surface are covered by the protective oxide skin.

Particularly good results are obtained when the glass is covered with a skin consisting of the oxide of that metal which is present in the vapor form in the device during the operation thereof, for example, we prefer to apply a skin of sodium or magnesium oxide to the surface of the glass container when the gaseous atmosphere of the lamp consists of or comprises sodium or magnesium vapor. Similarly when barium vapor is present in the lamp during operation thereof a barium oxide skin on the glass surface is preferred. The disintegration or vaporization temperature of the metal oxide skin is higher than the temperature attained by the container during the operation of the device. It will be understood that we include magnesium and beryllium under the term alkaline metals.

Several methods of carrying out the invention are described below by way of example.

When a glass vessel which is chemically stable in the presence of hot, sodium vapor is desired the following method of treatment is preferred. When desired the vessel is of tubular shape and consists of a glass having the following composition:—

| | Per cent |
|---|---|
| ($SiO_2$) | 60 |
| ($Na_2O$) | 20 |
| ($CaO$) | 10 |
| ($B_2O_3$) | 10 |

The tubular glass vessel is first evacuated and is then heated to about 400° C. While the vessel is at this temperature sodium vapor is passed therethrough. The sodium vapor attacks the glass surface physically which is indicated by the glass changing to a light brown color. An oxygen attaining atmosphere, such as air, is then introduced into the vessel while the vessel is heated to a temperature of about 550° C. The oxygen transforms the sodium deposited in and on the glass surface into an oxide. The sodium oxide forms an extremely thin skin which is transparent. After the oxidation of the sodium the vessel is again evacuated while still being heated to a temperature of 550° C. The vessel is then sealed off from the exhaust system and allowed to cool. We have demonstrated that a glass vessel treated in the manner described above is more resistant to attack by sodium vapor than a container made of the same glass and not treated in this manner. The demonstration was conducted as follows:

A half gram of sodium was introduced into a glass vessel which had been treated in the above manner and the vessel was then heated to a temperature of 350° C. in an oven. At the end of 500 hours substantially no discoloration of the glass was apparent. A similar vessel made of the same glass but which had not been provided with an oxide skin was subject to the same test but in this case the glass was dark brown in color after only 24 hours at the temperature of 350° C. A vessel treated in the above described manner is useful as the container for a sodium vapor discharge lamp.

We have demonstrated that a container for a magnesium vapor lamp can be made chemically stable in the presence of hot magnesium vapor in substantially the same manner as that described above. Take, for example, a container consisting of a glass having the following composition:

|  | Percent |
|---|---|
| (SiO₂) | 57 |
| (CaO) | 20 |
| (Al₂O₃) | 23 |

In accordance with this invention the container is first evacuated and is then heated to and maintained at a temperature of approximately 500° C. Magnesium vapor is then passed through the lamp until the effect of a physical attack by the vapor on the glass wall is apparent. Moist air is then introduced into the container and the temperature of the container is then raised to about 600° C. This oxidizes the magnesium in and on the glass surface and the slight discoloration of the glass which takes place during the physical attack by the magnesium vapor on the glass completely disappears. The container is then evacuated and a rare gas, such as argon at a pressure of from 1 to 10 mm., and a quantity of magnesium is introduced into the container after which the container is hermetically sealed. The lamp container described above is chemically stable in the presence of the hot, ionized magnesium vapor during the operation of the lamp and retains its transmissibility for visible light rays and the ultra violet rays emitted by the magnesium vapor for a long operating life of the lamp.

The oxide skin can be applied to the glass vessel in other ways, when desired, for example, a quantity of metal oxide can be vaporized in a vacuum from a suitable support, such as a platinum or platinum-rhodium wire, and can be deposited on the glass in the form of a thin skin. This method is particularly useful in forming a magnesium oxide or an aluminum oxide protecting skin on the inner surface of a glass vessel.

In the drawing accompanying and forming part of this specification a gaseous electric discharge lamp embodying the invention is shown in a front elevational, partly sectional view.

Referring to the drawing the gaseous electric discharge lamp device comprises a glass container 1 having main discharge supporting electrodes 2 and 3 and an auxiliary starting electrode 4 sealed therein at the ends thereof. Said electrodes 2 and 3 are electron emitting when heated and consist of a coiled metal filament, such as a tungsten filament having a body of electron emitting material associated therewith, such as barium oxide. Said container 1 has a starting gas therein, such as argon, neon or xenon or a mixture of such gases, at a pressure of approximately 1 to 10 mm. and a vaporizable material therein, such as magnesium. Said container 1 is made of a glass having the following composition:

|  | Percent |
|---|---|
| Silica (SiO₂) | 57 |
| Calcium oxide (CaO) | 20 |
| Alumina (Al₂O₃) | 23 |

Said container 1 has a thin, protecting, magnesium oxide skin 5 thereon which is applied thereto by the method described above. A magnesium vapor lamp having the above structure has a long useful operating life, is inexpensively manufactured and retains its efficiency for a long period since substantially no light absorbing discoloration of the container walls takes place.

It will be understood of course, that many changes may be made in the steps of the methods above described and in the form and details of the device illustrated without departing from the spirit and scope of the invention, for example, said container 1 is mounted in a heat conservator, such as an evacuated envelope, or a Dewar flask, when desired.

What we claim as new and desire to secure by Letters Patent of the United States is:—

1. A gaseous electric discharge lamp device comprising a container, electrodes sealed therein, a gaseous atmosphere therein comprising a discharge supporting chemically active metal vapor, said container being subject to attack by said vapor, and a thin skin on the inner surface of said container to protect said container from the deleterious effects of the metal vapor discharge, said skin consisting of the oxide of that metal the vapor of which constitutes part of the gaseous atmosphere of the device.

2. A gaseous electric discharge lamp device comprising a container, electrodes sealed therein, a gaseous atmosphere therein comprising a discharge supporting chemically active metal vapor, said container being subject to attack by said vapor, and a thin skin on the inner surface of said container to protect said container from the deleterious effects of the metal vapor discharge, said skin consisting of a metal oxide.

3. A gaseous electric discharge lamp device comprising a container, electrodes sealed therein, a gaseous atmosphere therein comprising discharge supporting, chemically active sodium vapor, said container being subject to attack by said vapor, and a thin skin of sodium oxide on the inner surface of said container to protect said container from the deleterious effects of the sodium vapor discharge.

4. A gaseous electric discharge lamp device comprising a container, electrodes sealed therein, a gaseous atmosphere therein comprising discharge supporting, chemically active magnesium vapor, said container being subject to attack by said vapor, and a thin skin of magnesium oxide on the inner surface of said container to protect said container from the deleterious effects of the magnesium vapor discharge.

MARI J. DRUYVESTEYN.
NICOLAAS WARMOLTZ.